Sept. 16, 1924.
I. ROY
ENDLESS TRACK VEHICLE
Filed June 28, 1920
1,509,030
5 Sheets-Sheet 3
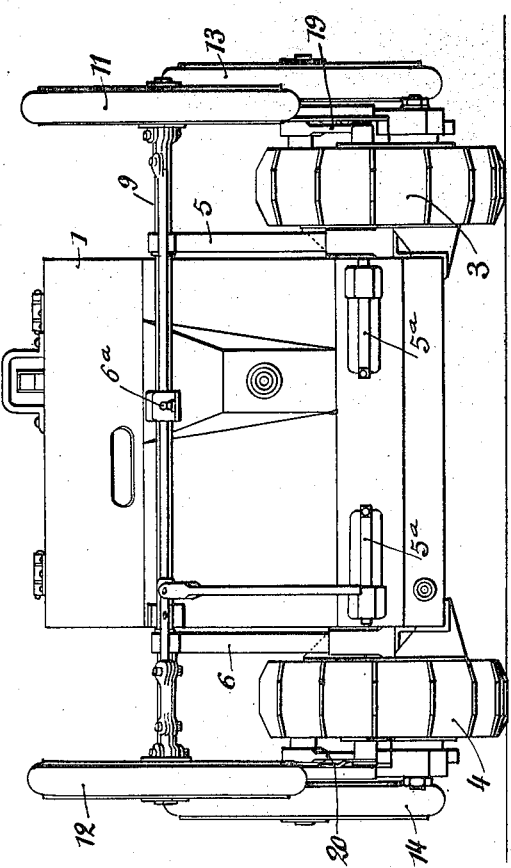
Inventor
Iréne Roy

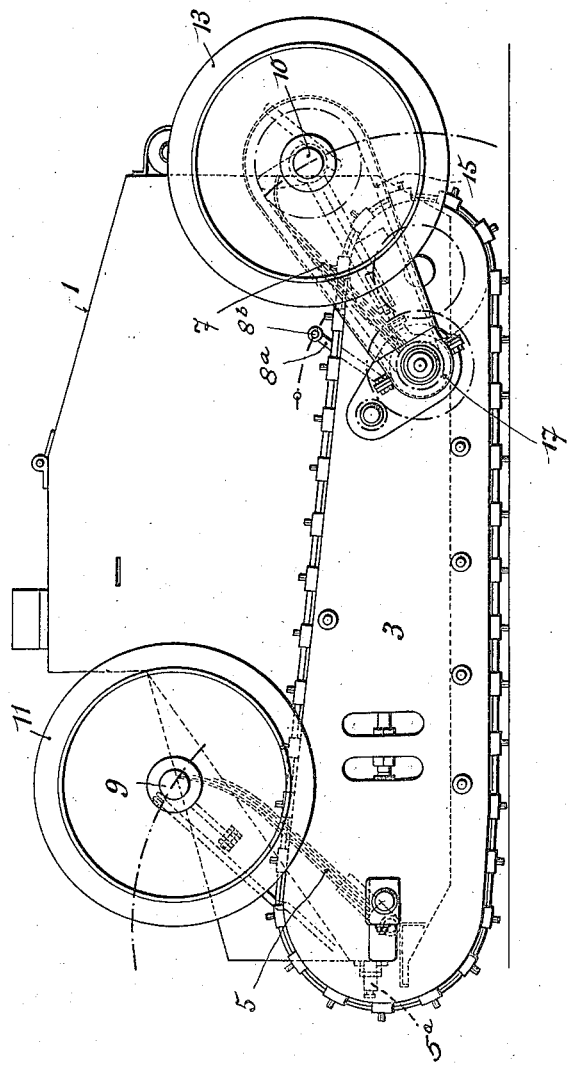

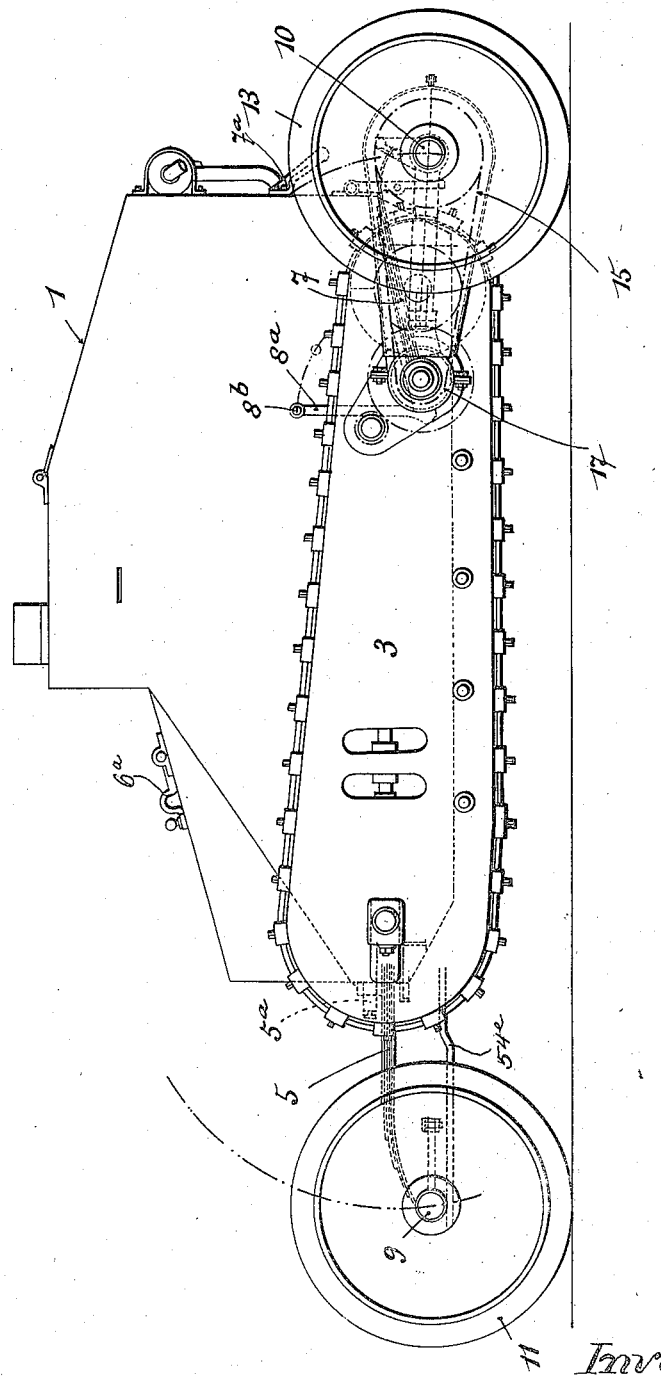

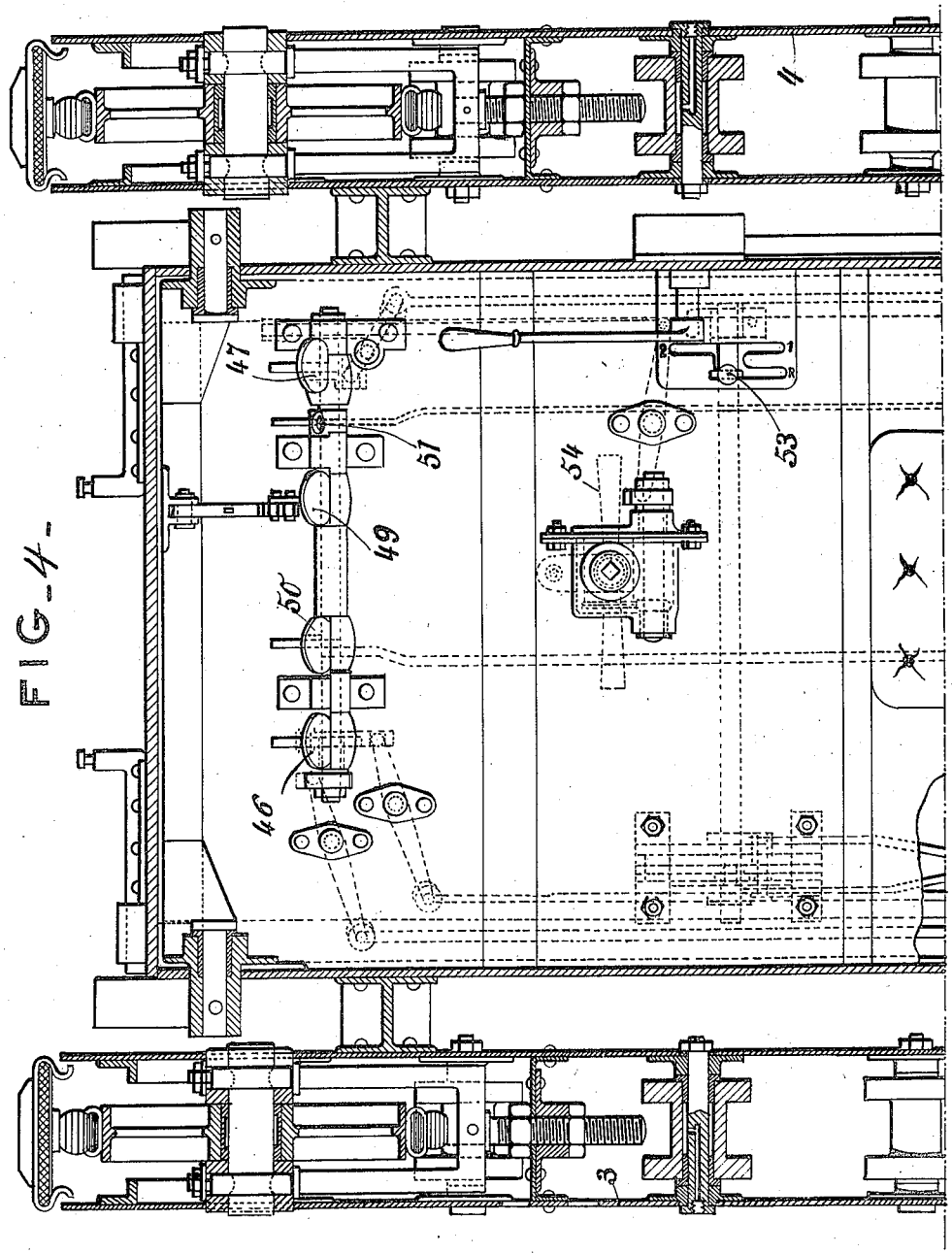

Sept. 16, 1924.
I. ROY
ENDLESS TRACK VEHICLE
Filed June 28, 1920     5 Sheets-Sheet 5
1,509,030
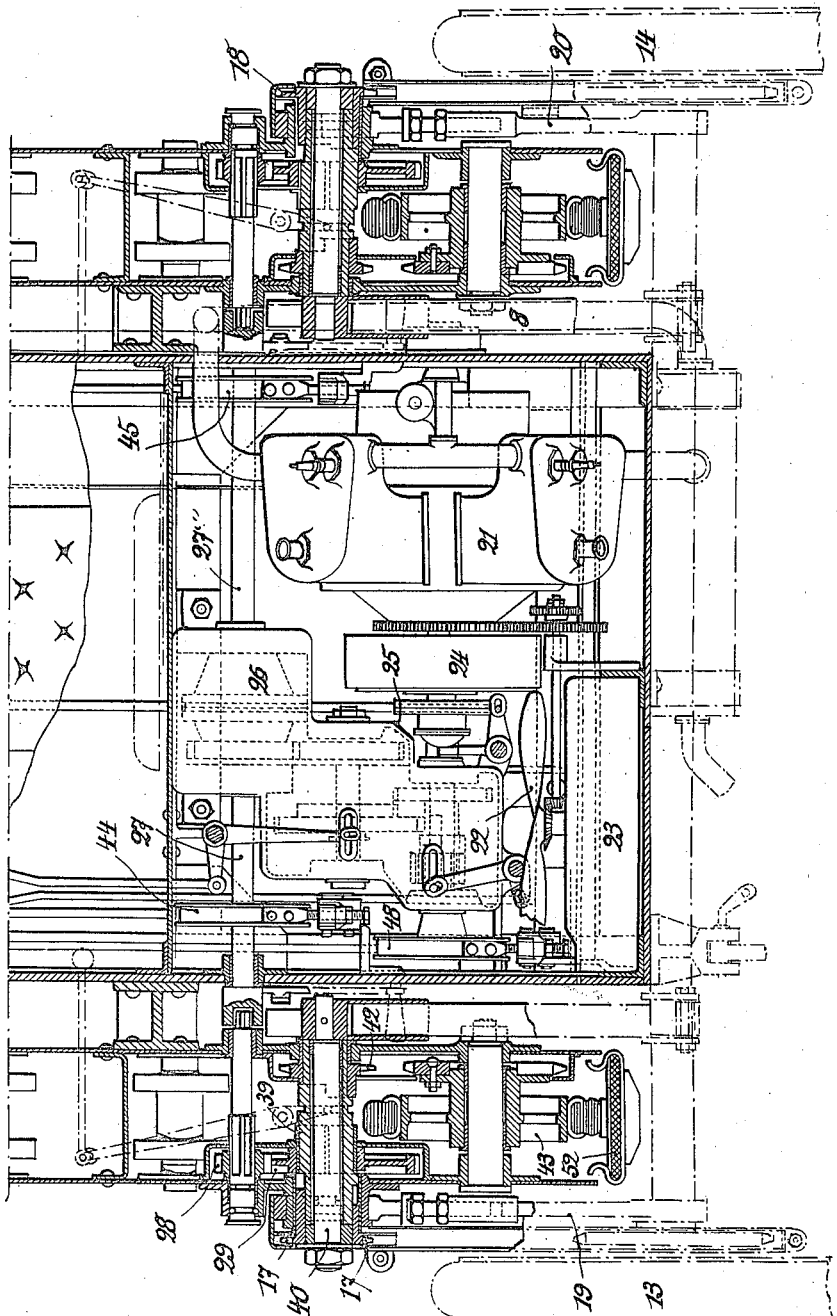
Inventor
Iréné Roy
H. B. Willson & Co.
Attorneys Patented Sept. 16, 1924.

1,509,030

UNITED STATES PATENT OFFICE.

IRÉNÉ ROY, OF PARIS, FRANCE.

ENDLESS-TRACK VEHICLE.

Application filed June 28, 1920. Serial No. 392,308.

*To all whom it may concern:*

Be it known that I, IRÉNÉ ROY, a citizen of the Republic of France, residing at Paris, Seine Department, 12 Rue de la Rochefoucault, in the Republic of France, have invented certain new and useful Improvements in Endless-Track Vehicles, of which the following is a specification.

The present invention has for an object the provision of a transmission for vehicles with mixed propulsion through wheels and endless tracks, combining the advantages of the driving devices used on the vehicles with endless tracks, together with means for driving the wheels in use in connection with an ordinary motor car for example.

This improved transmission comprises a differential gear which is acted upon by the motor and in which every lateral shaft can drive, at will, through the medium of gears, either the wheel, or the corresponding endless track and there being independent brakes provided on these lateral shafts.

The use of the differential gear allows the vehicle to run at great speed upon wheels and makes it possible, when running with endless tracks, to steer by means of these tracks only, in acting upon the brake which corresponds with the one or the other of the said tracks.

The following drawings are given by way of example.

Fig. 1 is an elevation of the vehicle resting upon the endless track members.

Fig. 2 shows the same vehicle resting upon its wheels.

Fig. 3 is a front view.

Figs. 4 and 5 are two horizontal half-sections.

In Figs. 1 and 2, 1 is an armour plated vehicle body connected to two endless track girders 3 and 4, and carrying through the medium of the articulated springs 5, 6, 7, 8 the two axles 9 and 10. Upon the axle 9 are mounted in the usual manner two steering wheels 11 and 12, while the axle 10 carries two driving wheels 13 and 14 actuated by the chains 15 and 16. These chains are driven by the pinions 17 and 18 whose axis of rotation coincides with the pivoting axle of the springs 7 and 8, whereby the wheels can be raised without requiring the removal of the said chains.

When adapted for travelling on the endless track, the springs 5, 6, 7, 8 are held locked by means of locking members $6^a$ and $7^a$. When adapted for travelling on the wheels, the springs 5 and 6 are locked by the sliding pieces $5^a$ and the springs 7 and 8 by the levers $8^a$ which hook on to the projections carried by the hub on which the springs are fixed. The levers $8^a$ are fitted with a locking system $8^b$ comprising, for instance, a spring actuated pawl. Tensioning means 19 and 20 allow of regulating the tension of the chains.

When it is necessary to pass from the one mode of propulsion to the other, the endless tracks are caused to rise as wedge shaped slopes. It is then easy to gear the wheels into the desired position.

In Figs. 3 and 4, it will be observed that the armor plated vehicle body contains at the front part a compartment for the driver and his machine gun; in the rear is the space containing the assemblage of the motor and mechanism.

In Figs. 4 and 5, 21 is a motor disposed across the vehicle and actuating an air fan 22 mounted in front of the radiator 23; the motor is connected through the clutch 24 to the change-speed box 25 containing a differential 26 disposed between two transverse shafts 27, $27^a$; each of these shafts actuates symmetrically disposed members, for instance the shaft 27 is connected through the pinion 28 to the pinion 29 slidable upon keys upon a double sleeve 39 provided with jaws and rotating upon a shaft 40. This sleeve affords means for coupling the pinion 29 to one of the two sprocket wheels 17 or 42 actuating the wheel 13 or the endless track pulley 43, and in this manner either the wheels or the endless tracks can be operated as desired.

The two brakes 44 and 45 mounted respectively on the shafts 27 and $27^a$ are actuated by the two pedals 46, 47 within reach of the driver, whereby the vehicle can be steered when running upon the endless tracks, and therefore the driver will have his hands free for operating the machine gun.

A brake 48 which is actuated by means of a ratchet pedal 49 is employed to slow up the vehicle or to stop the same upon gradients. The driver can also control the motor by means of a clutch release pedal 50 and an accelerator 51.

The endless tracks can be of any suitable type, those which are here represented being composed of flexible belting 52, while the pulleys are provided with elastic tires.

The driver and machine gun operator is seated in the front compartment, having at hand a speed changing lever 53 which provides for two driving speeds and back motion, this latter being employed when running upon wheels; in front of the driver is a removable hand wheel 54 which is used exclusively for steering the wheels and is taken off when endless track propulsion is employed. In the front part of the compartment is disposed a recess 55 containing an aiming bearing for a machine rifle, while a periscope disposed in the upper part is mechanically connected with the said machine rifle, whereby the latter can be aimed and the vehicle steered during the combat. Outside of these conditions, the driver makes use of a window provided with a shutter 56 disposed in front of his eyes. The firing ammunition is placed near at hand so as to be readily used.

By reason of their double propulsive means, the foregoing vehicles can be readily brought to the spot at a high-speed over the roads, without requiring them to make use of special truck frames.

From this standpoint, the rear spring mounting arrangement will evidently be the best for present use.

Claim—

In a motor-vehicle, the combination of a frame, two endless tracks, raisable wheels mounted on this frame and adapted to be geared into different positions with reference to this frame so as to cause the vehicle to rest sometimes upon the endless tracks and sometimes upon the wheels, a motor, a cross-shaft divided into two parts, a differential gear interposed between said motor and shaft, brakes with independent drive means respectively arranged on these parts of shaft, two fixed cross-shafts, sleeves free to revolve and to slide on these latter shafts and driven by said parts of shaft, two chain pinions revolving loosely on every one of these sleeves, driving the one, the wheel, the other the respective endless track, and means for connecting at will the one or the other of these pinions with the corresponding sleeve.

In testimony, that I claim the foregoing as my invention I have signed my name in presence of a subscribing witness.

IRÉNÉ ROY.

Witness:
MARCEL COMPIN.